United States Patent Office 3,503,987
Patented Mar. 31, 1970

3,503,987
CERTAIN SUBSTITUTED PICOLINOYL, NICOTINOYL AND ISONICOTINOYL HYDRAZONES
Masazi Kawai, deceased, late of Nishinomiya, Japan, by Yasuko Kawai, heir, Nishinomiya, Japan, assignor to Takeda Chemical Industries, Ltd., Osaka, Japan, a corporation of Japan
No Drawing. Filed Mar. 22, 1967, Ser. No. 625,271
Claims priority, application Japan, Mar. 23, 1966, 41/18,086
Int. Cl. A61k 27/00; C07d 31/34, 31/40
U.S. Cl. 260—295           12 Claims

---

ABSTRACT OF THE DISCLOSURE

Compounds of the formula

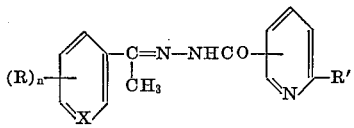

wherein

R=methyl, ethyl, methoxy, halogen, amino, acetylamino, acetyl, nitro, hydroxyl, ethoxycarbonyl, carboxyl, carbamoyl, carbamoyloxy;
R′=H or methyl;

and $n=0$, 1, 2 or 3, have sedative action and muscle relaxing activity, as well as low acute toxicity.

---

This invention relates to a series of pyridine derivatives having sedative action as well as muscle relaxant action and showing rather low acute toxicity.

The object of the present invention is to provide novel pyridine derivatives which are useful as tranquilizers or as sedatives of low acute toxicity, due to their effective sedative action as well as their muscle relaxant action.

The objective novel pyridine derivatives of the present invention are represented by the following formula:

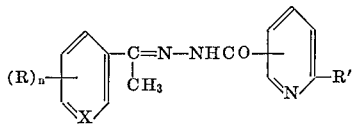

(I)

wherein R is methyl, ethyl, methoxy, halogen (e.g. chlorine, bromine), amino, acetylamino, acetyl, nitro, hydroxyl, carboxyl, carbamoyl or carbamoyloxy or ethoxycarbonyl, and R′ is hydrogen or methyl, and

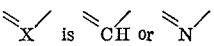

and $n$ is 0, 1, 2 or 3.

These new compounds show effective sedative action as well as effective muscle relaxant characteristics. Because of their rather low acute toxicity, these compounds are useful as effective tranquilizers of low toxicity.

The compounds of Formula I are prepared by allowing a compound of the formula

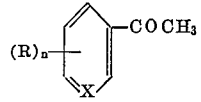

wherein

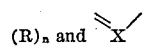

have the same meanings as above, to react with a compound of the formula

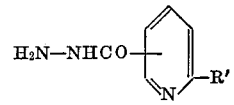

wherein R′ has the same meaning as above, according to the following reaction scheme:

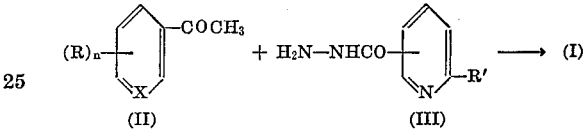

The reaction is carried out by heating the reactants in the presence of a solvent such as alcohol (e.g. methanol, ethanol, propanol, isopropanol, etc.), hydrocarbon or chlorinated hydrocarbon (e.g. benzene, chloroform, methylene chloride, toluene, etc.).

The reaction is accelerated by an acid catalyst such as organic acid or anhydride (e.g. acetic acid, acetic anhydride), inorganic acid (e.g. sulfuric acid, hydrochloric acid, hydrobromic acid, phosphoric acid, etc.).

Thus produced compounds of the Formula I are exemplified as follows:

acetophenone-6-methylnicotinoyl hydrazone;
4-methylacetophenone-6′-methylnicotinoyl hydrazone;
4-ethylacetophenone-6′-methylnicotinoyl hydrazone;
4-chloroacetophenone-6′-methylnicotinoyl hydrazone;
4-bromoacetophenone-6′-methylnicotinoyl hydrazone;
4-aminoacetophenone-6′-methylnicotinoyl hydrazone;
4-nitroacetophenone-6′-methylnicotinoyl hydrazone;
4-hydroxyacetophenone-6′-methylnicotinoyl hydrazone;
4-methoxyacetophenone-6′-methylnicotinoyl hydrazone;
4-acetylacetophenone-6′-methylnicotinoyl hydrazone;
4-acetylaminoacetophenone-6′-methylnicotinoyl hydrazone;
2-methoxyacetophenone nicotinoyl hydrazone;
2-methoxyacetophenone isonicotinoyl hydrazone;
3-methoxyacetophenone nicotinoyl hydrazone;
3-methoxyacetophenone isonicotinoyl hydrazone;
4-methoxyacetophenone picolinoyl hydrazone;
4-methoxyacetophenone nicotinoyl hydrazone;
4-methoxyacetophenone isonicotinoyl hydrazone;
4-ethoxycarbonyl-6′-methylnicotinoyl hydrazone;
4-carboxyacetophenone-6′-methylnicotinoyl hydrazone;
4-carbamoylacetophenone-6′-methylnicotinoyl hydrazone;
2-methoxyacetophenone-6′-methylnicotinoyl hydrazone;
6-methyl-3-acetylpyridine-6′-methylnicotinoyl hydrazone;
3 - methoxyacetophenone-6′-methylnicotinoyl hydrazone;
etc.

These pyridine derivatives form pharmaceutically acceptable acid addition salts with various inorganic acids such as hydrochloric acid, hydrobromic acid, sulfuric acid, phosphoric acid, etc., and with various organic acids such as tartaric acid, citric acid, malonic acid, succinic acid, etc.

When the compounds are used as tranquilizers or as sedatives, a daily dose of about 5 to about 500 milligrams, generally about 20 to about 100 milligrams for a human adult, is advisable.

The compounds (as such or as salts) of the present invention can be administered solely, or in combination with a pharmaceutically acceptable carrier, or can be administered together with other sedatives or tranquilizers, with or without any other pharmaceutically acceptable carrier, the compounds, being in any case administered as powder, tablets, solution, emulsion, etc. for oral administration, or as injections, etc. for non-oral administration.

The choice of carriers is determined by the preferred route of administration, the solubility of the compounds and standard pharmaceutical practice.

The following examples are solely for the purpose of illustration and are not to be construed as limitations of this invention, minor variations being possible without departing from the spirit or scope of this invention.

The relationship between parts by weight and parts by volume is the same as that between milliliters and grams.

EXAMPLE 1

Three parts by weight of 6-methylnicotinoyl hydrazine, 2.4 parts by weight of acetophenone and 2 parts by volume of acetic acid are dissolved in 50 parts by volume of methanol and the solution is refluxed for 4 hours, after which 300 parts by volume of water is added to the resulting reaction mixture to give white precipitates. After being collected by filtration and dried, the precipitates are recrystallized from methanol to give 4.7 parts by weight of acetophenone-6-methylnicotinoyl hydrazone as white needles melting at 172–173° C. Yield 93%.

*Elementary analysis.*—Calculated as $C_{15}H_{15}N_3O$ (percent): N, 16.88. Found (percent): N, 16.59.

EXAMPLE 2

Three parts by weight of 6-methylnicotinoyl hydrazine, 2.7 parts by weight of 4-methylacetophenone and 2 parts by volume of acetic acid are dissolved in 50 parts by volume of methanol. The solution is refluxed for 3 hours, after which 300 parts by volume of water is added to the resulting reaction mixture to give white precipitates. After being collected by filtration and dried, the precipitates are recrystallized from methanol to give 4.3 parts by weight of 4-methylacetophenone-6'-methylnicotinoyl hydrazone as white needles melting at 186–187.5° C. Yield 80.4%.

*Elementary analysis.*—Calculated as $C_{16}H_{17}N_3O$ (percent): N, 15.72. Found (percent): N, 15.70.

EXAMPLE 3

Three parts by weight of 6-methylnicotinoyl hydrazine, 3.0 parts by weight of 4-ethylacetophenone and 2 parts by volume of acetic acid are dissolved in 50 parts by volume of methanol. The solution is refluxed for 4 hours, after which 300 parts by volume of water is added to the resulting reaction mixture to give white precipitates. After being collected by filtration and dried, the precipitates are recrystallized from a mixture of methanol and water (1:1) to give 5.0 parts by weight of 4-ethylacetophenone-6'-methylnicotinoyl hydrazone as white needles melting at 157.5–158.5° C. Yield 90%.

*Elementary analysis.*—Calculated as $C_{17}H_{19}N_3O$ (percent): N, 14.93. Found (percent) N, 14.97.

EXAMPLE 4

Three parts by weight of 6-methylnicotinoyl hydrazine, 3.1 parts by weight of 4-chloroacetophenone and 2 parts by volume of acetic acid are dissolved in 50 parts by volume of methanol. The solution is refluxed for 4 hours, after which 300 parts by volume of water is added to the resulting reaction mixture to give white precipitates. After being collected by filtration and dried, the precipitates are recrystallized from methanol to give 5.1 parts by weight of 4-chloroacetophenone-6'-methylnicotinoyl hydrazone as white pillar crystals melting at 206.5–207.5° C. Yield 88.5%.

*Elementary analysis.*—Calculated as $C_{15}H_{14}N_3OCl$ (percent): N, 14.60. Found (percent): N, 14.50.

EXAMPLE 5

Three parts by weight of 6-methylnicotinoyl hydrazine, 4.0 parts by weight of 4-bromoacetophenone and 2 parts by volume of acetic acid are dissolved in 50 parts by volume of methanol. The solution is refluxed for 3 hours, after which 300 parts by volume of water is added to the resulting reaction mixture to give white precipitates. After being collected by filtration and dried, the precipitates are recrystallized from ethanol to give 6.5 parts by weight of 4-bromoacetophenone-6'-methylnicotinoyl hydrazone as white needles melting at 210–211.5° C. Yield 99%.

*Elementary analysis.*—Calculated as $C_{15}H_{14}N_3OBr$ (percent): N, 12.65. Found (percent): N, 12.93.

EXAMPLE 6

Three parts by weight of 6-methylnicotinoyl hydrazine, 2.7 parts by weight of 4-aminoacetophenone and 2 parts by volume of acetic acid are dissolved in 50 parts by volume of methanol. The solution is refluxed for 3 hours, after which 300 parts by volume of water is added to the resulting reaction mixture to give yellow precipitates. The precipitates are recrystallized from methanol to give 4.7 parts by weight of 4-aminoacetophenone-6'-methylnicotinoyl hydrazone as yellow prisms melting at 183–184° C. Yield 87.5%.

*Elementary analysis.*—Calculated as $C_{15}H_{16}N_4O$ (percent): N, 20.88. Found (percent): N, 20.62.

EXAMPLE 7

Three parts by weight of 6-methylnicotinoyl hydrazine, 3.0 parts by weight of 4-nitroacetophenone and 2 parts by volume of acetic acid are dissolved in 50 parts by volume of methanol. The solution is refluxed for 2 hours, after which 300 parts by volume of water is added to the resulting reaction mixture to give pale yellow precipitates. After being collected by filtration and dried, the precipitates are recrystallized from a mixture of benzene and ethanol (1:1) to give 5.8 parts by weight of 4-nitroacetophenone-6'-methylnicotinoyl hydrazone as pale yellow pillar crystals melting at 247–248° C. Yield 97%.

*Elementary analysis.*—Calculated as $C_{15}H_{14}N_4O_3$ (percent): N, 18.78. Found (percent): N, 18.56.

EXAMPLE 8

Three parts by weight of 6-methylnicotinoyl hydrazine, 2.7 parts by weight of 4-hydroxyacetophenone and 2 parts by volume of acetic acid are dissolved in 50 parts by volume of methanol. The solution is refluxed for 4 hours, after which 300 parts by volume of water is added to the resulting reaction mixture to give white precipitates. After being collected by filtration and dried, the precipitates are recrystallized from methanol to give 5.2 parts by weight of 4-hydroxyacetophenone-6'-methylnicotinoyl hydrazone as white crystals melting at 253.5–255° C. Yield 96.5%.

*Elementary analysis.*—Calculated as $C_{15}H_{15}N_3O_2$ (percent): N, 15.60. Found (percent): N, 15.79.

EXAMPLE 9

Three parts by weight of 6-methylnicotinoyl hydrazine, 3.0 parts by weight of 4-methoxyacetophenone and 2 parts by volume of acetic acid are dissolved in 50 parts by volume of methanol and the solution is refluxed for 4 hours, after which 300 parts by volume of water is added to the resulting reaction mixture to give white precipitates. After being collected by filtration and dried, the precipitates are recrystallized from methanol to give 4.9 parts by weight of 4-methoxyacetophenone-6'-methylnicotinoyl hydrazone as white scale crystals melting at 169.5–171° C. Yield 86.5%.

*Elementary analysis.*—Calculated as $C_{16}H_{17}N_3O_2$ (percent): N, 14.83. Found (percent): N, 14.68.

EXAMPLE 10

Three parts by weight of 6-methylnicotinoyl hydrazine, 3.2 parts by weight of 4-acetylacetophenone and 2 parts by volume of acetic acid are dissolved in 50 parts by volume of methanol and the solution is refluxed for 4 hours. The reaction mixture is subjected to filtration, and to the filtrate is added 100 parts by volume of water to yield white precipitates. After being collected by filtration and dried, the precipitates are recrystallized from methanol to give 2.0 parts by weight of 4-acetylacetophenone-6'-methylnicotinoyl hydrazone as white crystals melting at 190–191° C. Yield 34%.

*Elementary analysis.*—Calculated as $C_{17}H_{17}N_3O_2$ (percent): N, 14.23. Found (percent): N, 14.01.

EXAMPLE 11

1.5 parts by weight of 6-methylnicotinoyl hydrazine, 1.8 parts by weight of 4-acetylaminoacetophenone and 1 part by volume of acetic acid are dissolved in 30 parts by volume of methanol and the solution is refluxed for 4 hours, after which 300 parts by volume of water is added to the resulting reaction mixture to give yellow precipitates. After being collected by filtration and dried, the precipitates are recrystallized from a mixture of dimethylformamide and methanol (1:1) to give 2.5 parts by weight of 4-acetylaminoacetophenone-6'-methylnicotinoyl hydrazone as yellow crystals melting at 276.5–278.0° C. Yield 84%.

*Elementary analysis.*—Calculated as $C_{17}H_{18}N_4O_2$ (percent): N, 18.05. Found (percent): N, 18.24.

EXAMPLE 12

In like manner other pyridine derivatives are synthesized. The results are as follows:

| Compound | Melting Point (° C.) |
|---|---|
| 2-methoxyacetophenone nicotinoyl hydrazone | 131–132 |
| 2-methoxyacetophenone isonicotinoyl hydrazone | 180–180.5 |
| 3-methoxyacetophenone nicotinoyl hydrazone | 170.5–171 |
| 3-methoxyacetophenone isonicotinoyl hydrazone | 192–193 |
| 4-methoxyacetophenone picolinoyl hydrazone | 157–158 |
| 4-methoxyacetophenone nicotinyl hydrazone | 176–177 |
| 4-methoxyacetophenone isonicotinoyl hydrazone | 194.5–195 |
| 4-ethoxycarbonylacetophenone-6'-methylnicotinoyl hydrazone | 162–163 |
| 4-carboxyacetophenone-6'-methylnicotinoyl hydrazone | 309–311 |
| 4-carbamoylacetophenone-6'methylnicotinyl hydrazone | 300–304 |
| 2-methoxyacetophenone-6'methylnicotinoyl hydrazone | 138–139 |
| 3,4,5-trimethoxyacetophenone-6'-methylnicotinoyl hydrazone | 176–177 |
| 3,4,5-trimethoxyacetophenone picolinoyl hydrazone | 140–141 |
| 3,4,5-trimethoxyacetophenone nicotinoyl hydrazone | 173.5–175 |
| 3,4,5-trimethoxyacetophenone isonicotinoyl hydrazone | 211–212 |
| 3,4-dimethoxyacetophenone-6'-methyl nicotinoyl hydrazone | 165–166 |
| 3,4-dimethoxyacetophenone picolinoyl hydrazone | 138–139 |
| 3,4-dimethoxyacetophenone nicotinoyl hydrazone | 151–152 |
| 3,4-dimethoxyacetophenone isonicotinoyl hydrazone | 185–186 |
| 3-methoxyacetophenone picolinoyl hydrazone | 113–114 |
| 2-methoxyacetophenone picolinoyl hydrazone | 93–95 |

What is claimed is:

1. A member selected from the group consisting of compounds of the formula

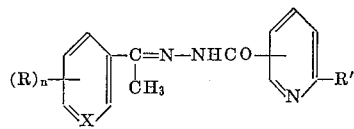

and pharmaceutically acceptable acid addition salts thereof, wherein R is 4-methyl, 4-chloro, 4-bromo, 4-acetyl, 4-carboxy, 4 - ethoxycarbonyl, 4-carbamoyl and 3,4,5-trimethoxy, R' is H or methyl,

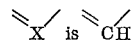

and $n$ is 1 and 3 with a proviso that when $n$ is 3, R is limited to 3,4,5-trimethoxy.

2. A compound according to claim 1, namely, 4-methylacetophenone-6'-methylnicotinoyl hydrazone.
3. A compound according to claim 1, namely, 4-chloroacetophenone-6'-methylnicotinoyl hydrazone.
4. A compound according to claim 1, namely, 4-bromoacetophenone-6'-methylnicotinoyl hydrazone.
5. A compound according to claim 1, namely, 4-acetylacetophenone-6'-methylnicotinoyl hydrazone.
6. A compound according to claim 1, namely, 4-ethoxycarbonylacetophenone-6'-methylnicotinoyl hydrazone.
7. A compound according to claim 1, namely, 4-carboxyacetophenone-6'-methylnicotinoyl hydrazone.
8. A compound according to claim 1, namely, 4-carbamoylacetophenone-6'-methylnicotinoyl hydrazone.
9. A compound according to claim 1, namely, 3,4,5-trimethoxyacetophenone-6'-methylnicotinoyl hydrazone.
10. A compound according to claim 1, namely, 3,4,5-trimethoxyacetophenone picolinoyl hydrazone.
11. A compound according to claim 1, namely, 3,4,5-trimethoxyacetophenone nicotinoyl hydrazone.
12. A compound according to claim 1, namely, 3,4,5-trimethoxyacetophenone isonicotinoyl hydrazone.

References Cited

FOREIGN PATENTS 90,971 11/1952 Denmark.
158,165 3/1957 Sweden.

HENRY R. JILES, Primary Examiner

A. L. ROTMAN, Assistant Examiner

U.S. Cl. X.R.

260—295.5, 297, 476, 479, 520, 558, 590, 999